Oct. 22, 1940.  J. H. O'DAY  2,219,112

IMITATION TREE CONSTRUCTION

Filed April 14, 1939

INVENTOR.
JOHN H. O'DAY
BY M. Talbert Dick
ATTORNEY.

Patented Oct. 22, 1940

2,219,112

UNITED STATES PATENT OFFICE 2,219,112

IMITATION TREE CONSTRUCTION

John H. O'Day, Des Moines, Iowa

Application April 14, 1939, Serial No. 267,873

5 Claims. (Cl. 41—15)

The principal object of my invention is to provide a metallic tree such as a Christmas tree that may be used over an extended period of time as compared to an ordinary cut tree.

A further object of this invention is to provide a metallic tree that is of novel construction and easily assembled.

A still further object of my invention is to provide a permanent artificial tree that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Cut trees for ornamental usage such as Christmas trees, are well known. The chief objections, however, to such trees are that they are a fire hazard, immediately start to lose their leaves or needles and have a very short useful life. I have overcome such objections as will hereinafter be appreciated.

Figure 1:
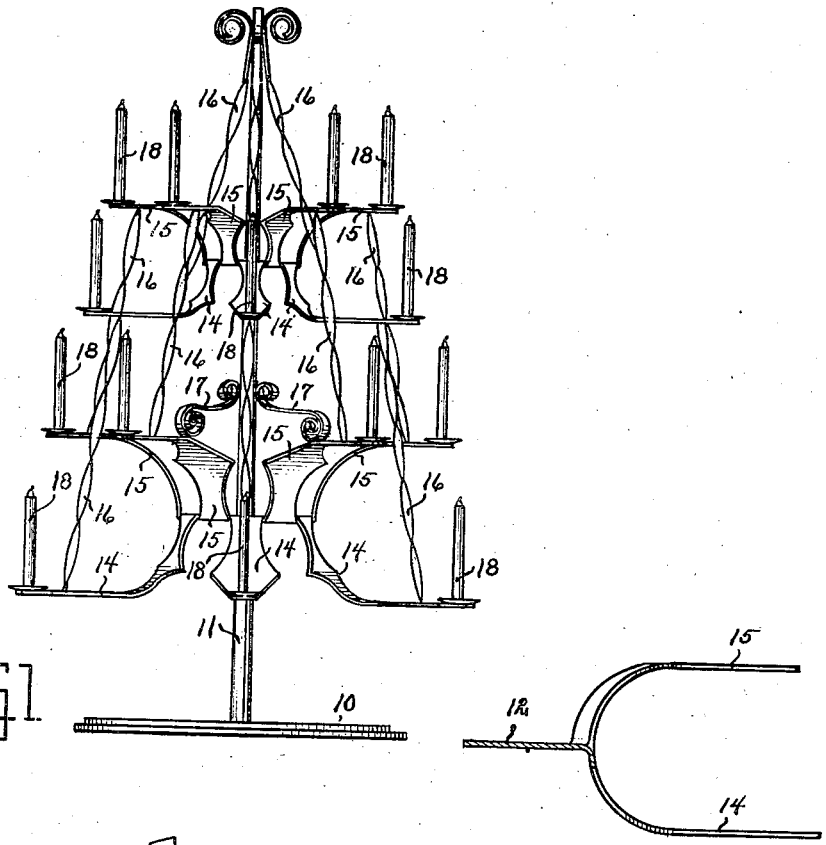
Fig. 1 is a side view of my tree.
Figure 3:
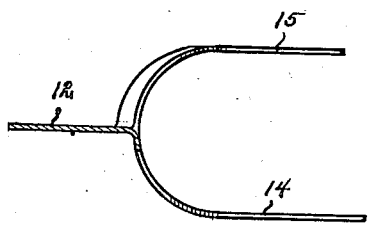
Fig. 3 is an enlarged side view of a section of the metal arms that make up the tree.
Figure 2:
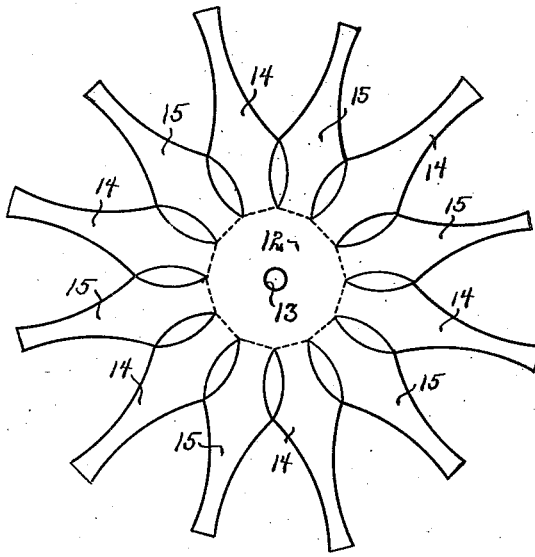
Fig. 2 is a top plan view of a metal stamping for forming one section of the branches or limbs of my tree.

Referring to the drawing, I have used the numeral 10 to designate a tree base designed to rest on a supporting surface such as a floor. The numeral 11 designates a metallic post vertically extending upwardly from said base. The branches of my tree are made in sections, each section being a single piece stamping such as shown in Fig. 2. I have used the numeral 12 to designate the center portion of this stamping which is in the form of a disc. The numeral 13 designates a hole positioned in the center of the portion 12. The numeral 14 designates a plurality of spaced apart radially extending arms extending from the periphery of the portion 12. The numeral 15 designates a similar set of spaced apart radially extending arms arranged alternately between the arms 14 as shown in Fig. 2. Each of these arms 14 and 15 has its two side edges flaring in curved lines first forwardly and outwardly and then inwardly and outwardly to terminate at the blunt outer end of the arm. The length of each arm where it extends forwardly and outwardly at its two edges is substantially shorter than that portion of where its two side edges extend in a curved path inwardly and forwardly. This portion of my device is stamped from a single sheet of suitable bendable metal. After stamping, the arms 14, which are slightly longer than the arms 15, are bent in a curved downward and outward path and then horizontally outwardly and the arms 15 are bent in a curved upwardly and outwardly path and then horizontally outwardly as shown in Fig. 1 and Fig. 3. By this construction, the arms 15 are in a plane above the arms 14. Any number of these one piece members may be used to form the branches of a tree. These sections are placed in spaced relationship on the post 11 as shown in Fig. 1. The post is inserted through the hole 13 of the base portion 12 and the base 12 secured by suitable means to the post 11 such as by solder. By the side edges of each of the arms 14 and 15 extending in the curved lines as shown in the drawing, these arms which form the branches of my tree have a very attractive appearance. Metal brace members 16 between the branches may be employed to add to the appearance of the tree and make the entire structure more rigid. Curved metal ornamental braces 17 secured to the arms and post also may be used. Candles or like lamps may be mounted on the outer end portions of each of the limb arms. The entire assembled structure provides a very attractive, fire-proof durable, artificial tree.

Some changes may be made in the construction and arrangement of my improved imitation tree construction without departing from the real spirit and purpose of my invention, and it is my intention to cover by my claims any modified forms of structure or use of mechanical equivalents which may be reasonably included within their scope.

I claim:

1. In an artificial tree, a metallic post member, a metallic disc member surrounding said post, and a plurality of metallic arms extending radially from said disc member to simulate the branches of a tree having their fastened ends all resting in a common horizontal plane; some of said arms being bent to extend in a plane substantially below the plane of said metallic disc member.

2. In an artificial tree, a metallic post member, a metallic disc member surrounding said post, and a plurality of radially extending metallic arms integrally formed with said disc member; each of said arms having their two side marginal edges first extending outwardly and forwardly in curved paths and then extending inwardly and forwardly in curved paths with some of said arms being bent to extend upwardly and outwardly in a curved path and other of said arms bent to extend downwardly and outwardly in a curved path.

3. In an artificial tree, a metallic post member, a metallic disc member surrounding said post, and a plurality of radially extending metallic arms integrally formed with said disc member; each of said arms having their two side marginal edges first extending outwardly and forwardly in curved paths and then extending inwardly and forwardly in curved paths; some of said arms having their lengths bent upwardly and outwardly and other of said arms being bent downwardly and outwardly to simulate a plurality of branches of a tree.

4. In an artificial tree, a metallic post member, a metallic disc member surrounding said post, and a plurality of radially extending metallic arms integrally formed with said disc member; each of said arms having their two side marginal edges first extending outwardly and forfardly in curved paths and then extending inwardly and forwardly in curved paths; some of said arms having their lengths bent upwardly and outwardly and other of said arms being bent downwardly and outwardly to simulate a plurality of branches of a tree, and brace members extending from said post member to the outer end portions of some of said arms.

5. In an artificial tree, a metallic post member, a metallic horizontal disc member surrounding said post and a plurality of metallic arms integrally formed on said disc member, and extending radially therefrom; some of said arms being bent to extend upwardly and outwardly in a curved path and other of said arms bent to extend downwardly and outwardly in a curved path.

JOHN H. O'DAY.